United States Patent
Paparoni

[11] Patent Number: 6,082,214
[45] Date of Patent: Jul. 4, 2000

[54] REVERSE GEAR SHIFT INHIBITOR

[76] Inventor: Paolo Paparoni, Rua Freire Bastos, 112, São Paulo, Brazil

[21] Appl. No.: 08/973,332
[22] PCT Filed: Jun. 5, 1996
[86] PCT No.: PCT/BR96/00022
  § 371 Date: Dec. 4, 1997
  § 102(e) Date: Dec. 4, 1997
[87] PCT Pub. No.: WO96/39592
  PCT Pub. Date: Dec. 12, 1996

[30] Foreign Application Priority Data

Jun. 6, 1995 [IT] Italy ................................ TO95A0468

[51] Int. Cl.[7] ................................................... F16H 61/18
[52] U.S. Cl. ............................................................ 74/473.22
[58] Field of Search ....................... 74/473.22, FOR 103

[56] References Cited

U.S. PATENT DOCUMENTS

| | | |
|---|---|---|
| 1,241,414 | 9/1917 | Masury et al. .................. 74/473.22 |
| 1,250,355 | 12/1917 | Robinson et al. . |
| 1,951,876 | 3/1934 | Lapsley . |
| 3,031,898 | 5/1962 | Eaton . |
| 4,324,150 | 4/1982 | Kawamoto ......................... 74/473.22 |
| 4,476,740 | 10/1984 | Ida et al. ............................ 74/473.22 |
| 4,524,635 | 6/1985 | Hulin et al. ........................ 74/473.22 |
| 4,638,678 | 1/1987 | Gorman et al. ................... 74/473.22 |
| 4,646,585 | 3/1987 | Strohmeyer ....................... 74/473.22 |
| 4,660,433 | 4/1987 | Horiuchi et al. .................. 74/473.22 |

*Primary Examiner*—Mary Ann Battista
*Assistant Examiner*—William C Joyce
*Attorney, Agent, or Firm*—Steinberg, Raskin & Linberchuk, P.C.

[57] ABSTRACT

A bolt (11) associated to a lever articulation fixed structure. The bolt (11), supported on an axially moveable tube (12) relative to a lever (10), is displaceable for surpassing an inhibitor lock (21) allowing a reverse gear to be shifted and the gear lever (10) displaceable in three shift planes (P1–P2–P3). In order to improve the gear lever (10) movement capacity, the inhibitor lock (21) is rotatably secured to the fixed structure (22) and is subjected to the action of an elastic mechanism (23) which generates a force tending to distance the lock itself (21) from the path traveled by the bolt (11) during the lever (10) handling in the first and second shift planes (P1–P2).

5 Claims, 5 Drawing Sheets

REVERSE GEAR SHIFT INHIBITOR

REFERENCE TO PENDING APPLICATIONS

This application is a U.S. national stage application based on PCT Patent Application No. PCT/BR96/00022 filed Jun. 5, 1996 and entitled IMPROVEMENTS OF REVERSE GEAR INVOLUNTARY ARTICULATION INHIBITOR DEVICE.

BACKGROUND OF THE INVENTION

The present invention relates to a reverse gear involuntary articulation inhibitor device for external commands of automobiles speed gears. More precisely, the invention relates to an inhibitor device of the type comprising a bolt consisting of the gear lever and an inhibitor lock consisting of the lever fixed articulation and in which the bolt, supported on an axially movable tube relative to the lever, is displaceable for surpassing the inhibitor lock and allow the reverse gear articulation.

In general, in the external commands of automobile speed gears, the gears selection and articulation is made according to FIG. 1 referring to a command for a five-relation gear, plus the reverse gear.

According to this prevailing adoption scheme, the first and second gears are opposed and aligned in correspondence to a shift plane which is located on the left side (referring to the scheme) of the central position, or dead point of the gear level, the third and fourth gears are opposed and aligned in correspondence to a shift plane which passes by the central position and the fifth gear is opposed to the reverse gear and aligned with it in a shift plane disposed on the right side of said central position.

The inhibitor lock is essentially for preventing the reverse gear involuntary articulation, mainly when the gear is chosen passing from the fifth to the fourth gear or, more generally when this latter gear is inserted from a dead point provisional position, procedure which is often made by inexperienced drivers, for example, on an incline. For this purpose, in known dispositions, the lock consists in a small fixed block of rigid material, provided with an opposition inclined plane which, during the disarticulation procedure of the fifth gear, secures a corresponding and conjugate inclined plane of the bolt associated to the lever for preventing the straight displacement corresponding to the reverse gear articulation and for deviating the lever itself towards the central articulation plan, according to a substantially coiled travel, in order to facilitate the fourth gear shift; the reverse gear shift is only possible by means of the voluntary lifting of the bolt and by the consequent release of this inhibitor lock bolt. However, if the passage from the fifth to the fourth gear is carried out quickly, the driver notices the unpleasant crash of the bolt with the inhibitor lock and, if the lever is firmly hold instead of being pushed so as to be opposed to the free displacement, according to the above mentioned coiled travel, there may usually occur the bolt jamming against the inhibitor lock with the consequent blockage of the fourth gear articulation procedure.

The present invention is intended to eliminate these and other drawbacks and, within this general purpose scope, it has the important purpose to improve said reverse gear inhibitor devices in order to substantially improve the movement capacity of the gear lever and increase the command reliability, eliminating locking possibility in case of an incorrect maneuver carried out by inexperienced drivers.

According to the present invention, these and other important purposes are realized by means of a reverse gear involuntary shift inhibitor device, having its features specified according to the claims below.

The invention is substantially based on the concept of securing the inhibitor lock in rotating and not fixed fashion, and subject it to the action of an elastic means which applies, to said lock, a moment which tends to distance the inclined plane of said lock from the bolt corresponding conjugate inclined plane travel.

Thus, as it will be evident from the following description, when correctly passing from the fifth to the fourth gear, the contact between the bolt and the inhibitor lock is practically eliminated, thanks to this lock separation from the bolt travel by means of said elastic means action.

Therefore, the above mentioned crash sensation, which is felt in the lever during the maneuver thereof, specifically when said movement is carried out quickly, is eliminated.

According to a preferred embodiment of the invention, the rotating inhibitor lock consists of an oscillating lever [a lever in closed square] according to an axis which is located in a substantially parallel plane to the central shift plane. This lever [in square] comprises a lower arm extending in a substantially orthogonal direction towards said central articulation plane and shows the opposition inclined plane cooperating with the corresponding lever bolt conjugate plane, and an upper arm extending substantially parallel towards the central articulation arm. Over the upper arm, there acts an impulse finger which is interdependent in the bolt tube and able to oppose said elastic means force acting on the lock. Like this, the gear lever movement occurs incorrectly, that is to say, not following said coiled travel, said impulse finger, acting on the inhibitor lock, prevents the rotation thereof induced by the elastic means, so that the opposition inclined plane remains in the bolt interception position thus preventing, by the bolt jamming, the reverse gear involuntary shift. The improved device features, purpose and advantages, according to the present invention, become evident from the following detailed description and with reference to the attached drawings, provided as non limiting example, in which.

DETAILED DESCRIPTION OF THE PREFERRED EMBODIMENTS

Figure 1:
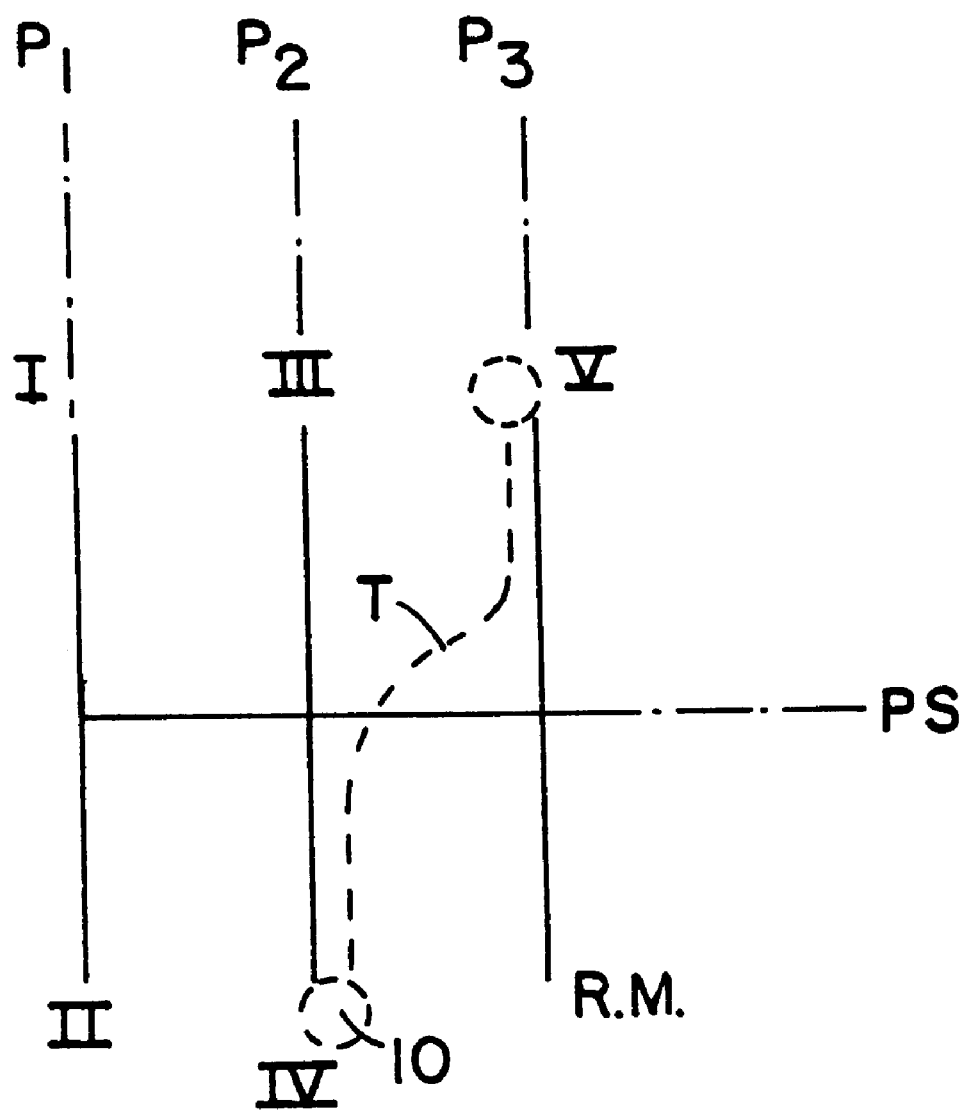
FIG. 1 is the gear lever movement scheme for selecting and articulating the gears in a five-relation speed gear plus the reverse gear.

In FIG. 1, the tracings over the drawing plane, of the first, second and third shift planes of respective double gears I–II, III–IV and V-RM (reverse gear) are indicated with P1–P2–P3, and said gears selection medium plane tracing is indicated with PS. The first plane $P_1$ of I–II pair shift is located, referring to the drawing, on the left side of the second III–IV pair articulation central plane $P_2$ and the third V-RM (reverse gear) pair shift plane $P_3$, on the right side of said second central plane $P_2$.

The gear lever 10 movement in the shift plane $P_3$ is controlled by an inhibitor device which has the function to prevent the reverse gear RM involuntary shift, for example, when lever 10 is displaced from the fifth gear shift position to the fourth gear shift position deviating the lever 10 along a coiled travel indicated with T in FIG. 1.

The inhibitor device, indicated in its assembly as No. 20, comprises a bolt 11 fixed to tube 12, which is seated over lever 10 and is axially movable in relation to this latter, against the action of a spring 13; the tube is provided with an end collar 12a which intends to secure and displace the tube itself.

The bolt cooperates with the inhibitor lock 21 which, according to the invention, consists of an oscillating lever [in oscillating square] pivoted to a fixed support 22 and rotating about an articulation preferential axis "a" which is located in a substantially parallel plane to the second shift plane $P_2$ and oriented substantially orthogonally to the axis of lever 10 10 considered in its dead point central position D.

Figure 2:
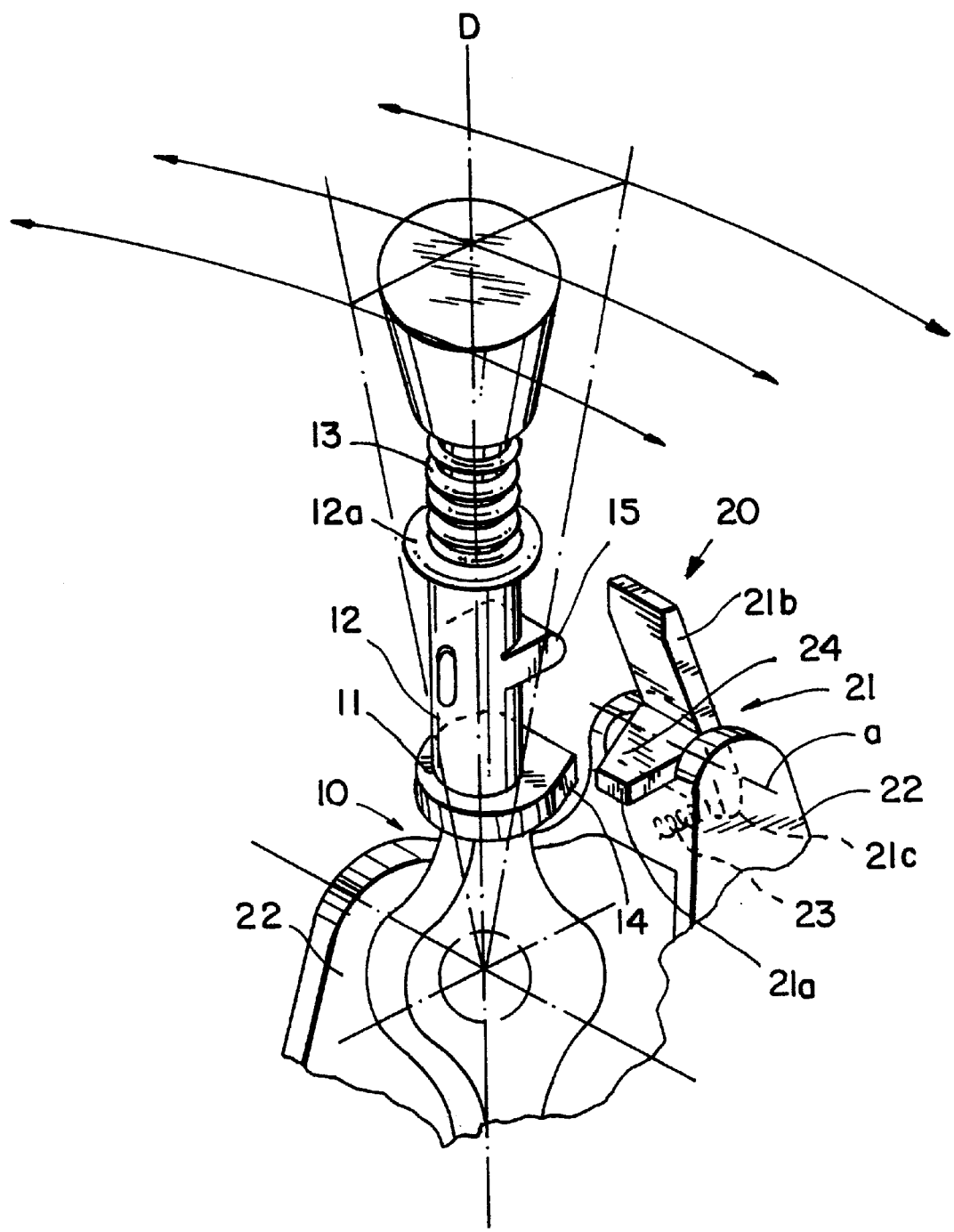
FIG. 2 is an exploded perspective view of a gear lever with the improved inhibitor device according to the invention.

As clearly shown in FIG. 2, the lever 21 comprises a lower arm 21a which extends in a substantially orthogonal direction towards said second shift plane $P_2$, and an upper arm 21b extending in a substantially parallel direction towards said shift plane $P_2$. The lower arm 21a and the upper arm 21b meet each other substantially in opposite parts in relation to the articulation axis "a" and the upper arm extends into a lower continuation 21c also located on the upper arm opposed part in relation to axis "a".

The lower arm 21a is provided with an opposition inclined plane 24 which can cooperate with the corresponding inclined and conjugate plane 14 existing on the bolt 11. On the lower continuation 21c of lock 21, there acts a thrust spring 23 which subjects the lock itself to an elastic moment that tends to make it turn in a certain sense (anticlockwise referring to FIG. 3) for displacing the lower arm 21a out of the path traveled by bolt 11 when the gear lever is manipulated in the shift plane $P_3$. The movable tube 12 of bolt 11 presents a thrust finger 15 oriented towards the upper arm 21b of lock 21 and able to secure said arm in order to be opposed to the spring 23 action and prevent said lock oscillation when lever 10 is manipulated in the shift plane $P_3$ (V-RM).

Lock 21 may then oscillates between a non-interference inactive position with bolt 11 and an interference operational position with said bolt.

The inactive position, determined by the spring 23 action, is kept by the inhibitor lock 21 for the gear lever 10 displacements in the shift planes $P_1$ or $P_2$ I–II gears pair and respectively III–IV.

Figure 3:
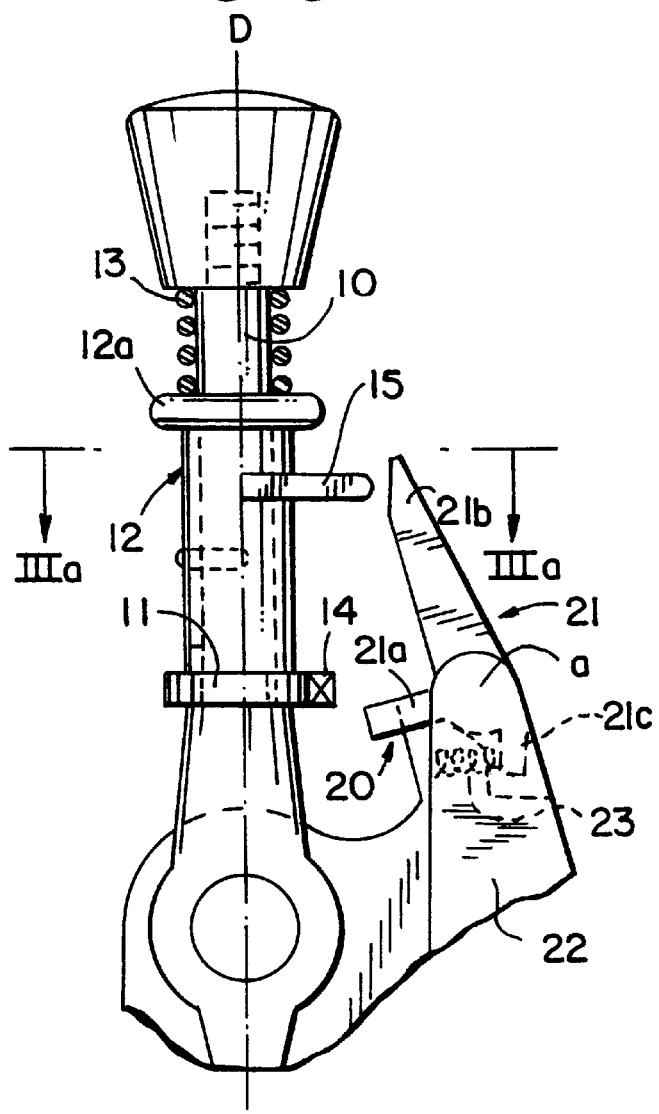
FIG. 3 is an elevation (or front) view of FIG. 2 device, showing said device inactive embodiment corresponding to the gear lever central position or dead point.
Figure 3A:
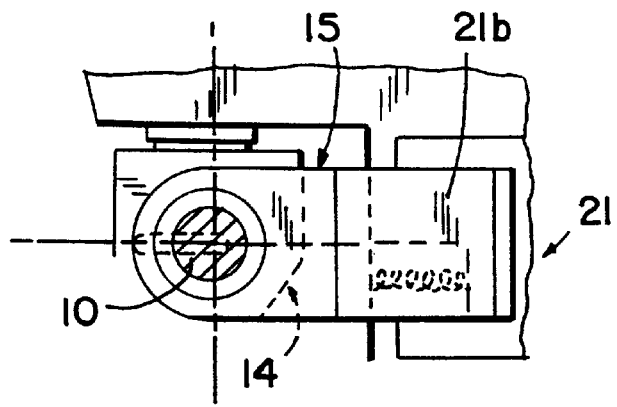
FIG. 3a is a section according to line IIIa—IIIa of FIG. 3.
Figure 4:
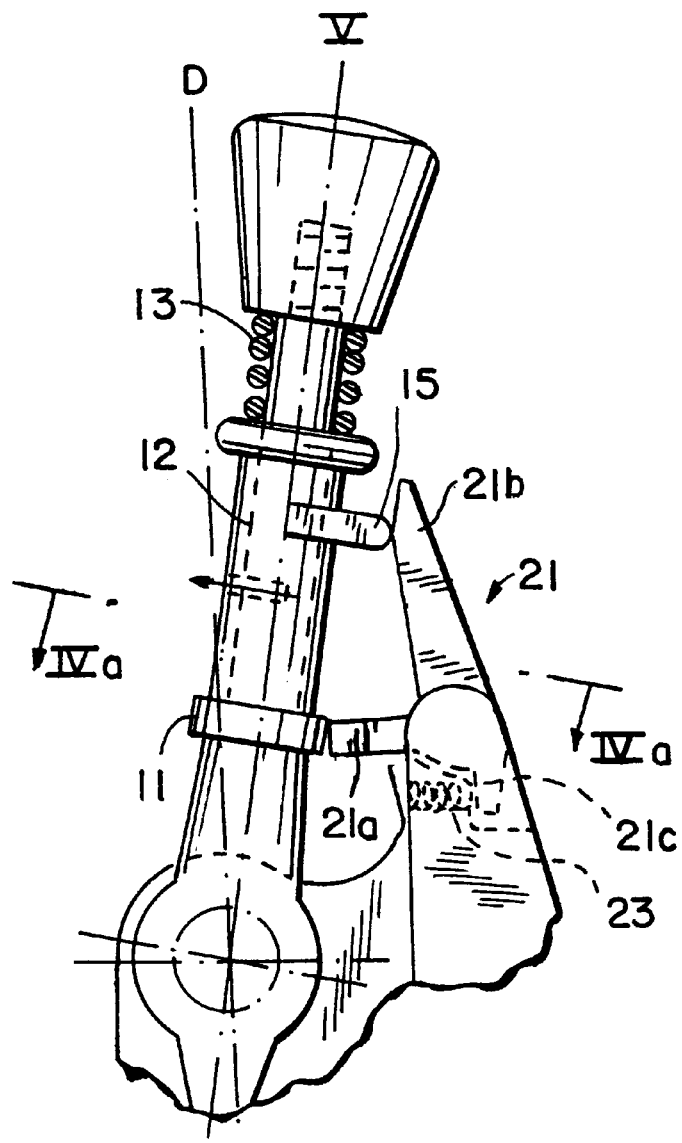
FIG. 4 is a similar view to FIG. 3, showing the device active embodiment corresponding to the fifth gear and reverse gear shift position of the gear lever.
Figure 4A:
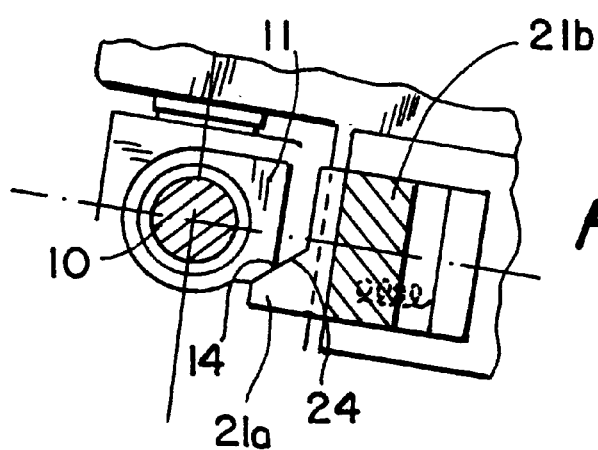
FIG. 4a is a section according to line IVa—IVa of FIG. 4.
Figure 5:
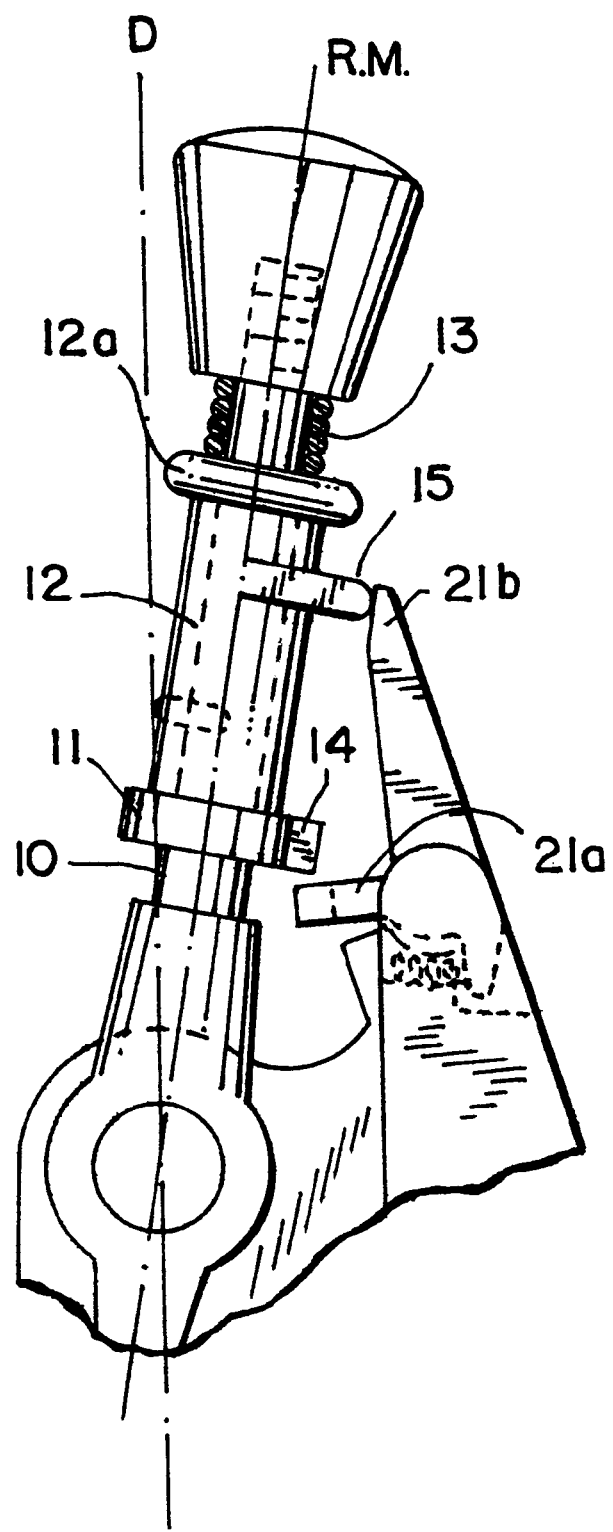
FIG. 5 is a similar view to FIG. 3, showing the device in the voluntary release position allowing the reverse gear shift.

In this inactive position, illustrated in FIGS. 3 and 3a, the above mentioned thrust finger 15 is released, or substantially released, from arm 21b of lock, which allows, as before mentioned, the lock rotation in a certain sense (anticlockwise in the figure) in accordance to the spring thrust direction and determines the arm 21 displacement out of the bolt travel 11. The operational position, in contrary, is assumed by lock 21 when lever 10 is manipulated by the shift plane $P_3$. In this operational position, illustrated in FIGS. 4 and 4a, the thrust finger 15, securing the arm 21b, displaces the lock 21 against the spring 23 action, taking the arm 21 on the bolt travel 11, so that its inclined plane 14 can secure the corresponding opposition plane 24 of arm 21a for preventing the reverse gear shift. For this reason, this shift is only possible by raising the bolt 11, what can be carried out by sliding the tube 12 against the spring action 13 for taking the bolt itself to the position illustrated in FIG. 5.

By means of the description above, it is easily understood that, in the passage from gear V to IV, if lever 10 is correctly manipulated along travel T illustrated above, the thrust finger 15 tends to gradually distance from arm 21b of lock 21 requested by spring 23 and, consequently, the arm 21a tends to distance from the bolt travel 11 so that, when the lever 10 reaches the dead point central position, lock 21 is practically released from bolt 11 and the gear movement occurs, according to the purposes mentioned, with no crash between said lock and bolt.

The wrong movement of lever 10, forced to remain in the shift plane $P_3$, is in contrary prevented by means of lock 21 as soon as the lock reaches the dead point central position.

Naturally, having the discovery principle established, the accomplishment details and embodiments may be widely varied, in relation to everything described and illustrated as non-limitative example. In particular, the lock 21 may be pivoted about the described preferential axis "a" and thus substantially parallel to the lever 10 axis. These and other possible variations are within the scope of the present invention, defined by the following claims, in which the reference numerals are shown for a better understanding.

What is claimed is:

1. A reverse gear involuntary articulation inhibitor device for external commands of an automobile speed gear, comprising:

a bolt (11) mounted on a gear lever (10) and an inhibitor lock (21) secured to a lever articulation fixed structure, in which the bolt (11) supported on a tube (12), adapted to be moved axially along the gear lever (10), is adapted to be displaced for surpassing the inhibitor lock (21) and allowing the reverse gear to be shifted and in which the gear lever (10) is displaceable in a first, second and third shift plane (P1, P2, P3), characterized in that the inhibitor lock (21) is rotatably secured to said fixed structure (22) and is subjected to the action of an elastic means (23) which generates a force which biases the lock (21) to a set position, clear of the path traveled by the bolt (11) during the gear lever movement in the first and second shift planes (P1, P2) wherein the inhibitor lock (21) rotates about a rotation axis (a) located in a substantially parallel plane to the second shift plane (P2) and is oriented substantially orthogonally to said lever axis (10) when said lever is in its dead point central position.

2. A device according to claim 1, characterized in that said inhibitor lock (21) comprising a lever having a lower arm (21a) and an upper arm (21b), which are perpendicular to one another, wherein the lower arm is provided with an opposition inclined plane (24) which is adapted to cooperate with a corresponding conjugate plane of said bolt (11) and in that the upper arm is adapted to be abutted against a thrust finger (15) mounted on the support tube (12) or bolt (11) and opposed to the force generated by said elastic means (23) on said inhibitor lock (21) when the gear lever (10) is moved in the third shift plane (P3).

3. A reverse gear involuntary articulation inhibitor device for external commands of an automobile speed gear, comprising:

a bolt mounted on a gear lever (10) and an inhibitor lock (21) secured to a lever articulation fixed structure, in which the bolt (11), supported on a tube (12) adapted to be moved axially, in relation to the gear lever (10), is adapted to be displaced for surpassing the inhibitor lock (21) and allowing the reverse gear to be shifted and in which the gear lever (10) is adapted to be displaced in first, second and third shift planes (P1, P2, P3), characterized in that the inhibitor lock (21) is rotatably secured to said fixed structure (22) and is subjected to the action of an elastic means (23) which generates a force which biases the lock to a set position, clear of the path traveled by the bolt (11) during gear lever movement in the first and second shift planes (P1, P2);

the inhibitor lock (21) rotates about a rotation axis (a) located in a parallel plane to the second shift plane (P2) and is oriented orthogonally to an axis of said gear lever (10) when said lever is its dead point central position; and said inhibitor lock (21) comprising a lever having a lower arm (21a) and an upper arm (21b) disposed perpendicularly to one another, the lower arm being provided with an opposition inclined plane (24) which cooperates with a corresponding conjugate plane of said bolt (11) and the upper arm is adapted to engage with a thrust finger (15) secured to the support tube (12) or bolt (11) to oppose the force generated by said elastic means (23) on said inhibitor lock (21) when the gear lever (10) is moved in the third shift plane (P3).

4. A device according to claim 3 characterized in that the lower arm (21a) and the upper arm (21b) of said inhibitor lock (21) are located relative to said rotation axis (a) of said inhibitor lock (21), such that said rotation axis (a) intersects a portion of the lever lying between opposite ends of said arms.

5. A device according to claim 4 characterized in that the upper arm (21b) of said inhibitor lock (21) extends in a continuation (21c) toward the opposite end relative to the rotation axis (a), in that on said continuation, there acts a thrust spring (23) which subjects the lock (21) to an elastic moment which biases the lower rotation arm (21a) in a position clear of the path traveled by said bolt (11) when the gear lever (10) is manipulated in the first and second shift planes (P1,P2).

* * * * *